(12) United States Patent
Kim et al.

(10) Patent No.: US 11,449,588 B2
(45) Date of Patent: Sep. 20, 2022

(54) ELECTRONIC DEVICE AND METHOD FOR CONTROLLING THE SAME

(71) Applicant: LG ELECTRONICS INC., Seoul (KR)

(72) Inventors: Kokeun Kim, Seoul (KR); Beomoh Kim, Seoul (KR); Sungjin Kim, Seoul (KR); Sooyoung Sim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 425 days.

(21) Appl. No.: 16/490,060

(22) PCT Filed: Mar. 18, 2019

(86) PCT No.: PCT/KR2019/003135
§ 371 (c)(1),
(2) Date: Aug. 29, 2019

(87) PCT Pub. No.: WO2020/189811
PCT Pub. Date: Sep. 24, 2020

(65) Prior Publication Data
US 2021/0406347 A1 Dec. 30, 2021

(51) Int. Cl.
*G06F 21/32* (2013.01)
*G06F 21/34* (2013.01)
(Continued)

(52) U.S. Cl.
CPC .............. *G06F 21/32* (2013.01); *G06F 21/34* (2013.01); *G06F 21/45* (2013.01); *G06Q 20/4014* (2013.01); *G06F 2221/2117* (2013.01)

(58) Field of Classification Search
CPC .......... G06F 21/32; G06F 21/34; G06F 21/45; G06F 2221/2117; G06F 21/31; G06F 21/35; G06F 21/316; G06Q 20/4014; G06Q 20/4012; H04L 9/3231; H04L 63/0861; H04L 63/083; H04L 9/3228; H04L 2463/082; H04L 9/3226; G07C 9/37; G07C 9/257; G07C 9/26; G06K 9/00892;
(Continued)

(56) References Cited

U.S. PATENT DOCUMENTS 6,980,670 B1 * 12/2005 Hoffman .................. G07C 9/37
705/14.23
9,467,293 B1 * 10/2016 Brainard ............... H04L 9/3231
(Continued)

FOREIGN PATENT DOCUMENTS

| JP | 2007334707 | 12/2007 |
| KR | 100785768 | 12/2007 |

(Continued)

OTHER PUBLICATIONS

PCT International Application No. PCT/KR2019/003135, Notification of Transmittal of The International Search Report and the Written Opinion of the International Searching Authority, or Declaration dated Dec. 12, 2019, 10 pages.

*Primary Examiner* — David Garcia Cervetti
(74) *Attorney, Agent, or Firm* — Lee, Hong, Degerman, Kang & Waimey PC

(57) ABSTRACT

The present disclosure relates to an electronic device that is capable of multimodal biometric authentication and a method of controlling the electronic device.

11 Claims, 8 Drawing Sheets

(51) Int. Cl.
*G06F 21/45* (2013.01)
*G06Q 20/40* (2012.01)

(58) Field of Classification Search
CPC .......... G06K 9/00885; G06K 9/00087; G06K 9/00926; G07F 7/1008; H04W 12/06; H04W 12/065
See application file for complete search history.

(56) References Cited

U.S. PATENT DOCUMENTS

| | | | | |
|---|---|---|---|---|
| 9,830,445 | B1* | 11/2017 | Machani | G06F 21/32 |
| 9,928,379 | B1* | 3/2018 | Hoffer | G16H 50/20 |
| 2003/0046540 | A1* | 3/2003 | Nakamura | G07C 9/257 |
| | | | | 713/168 |
| 2003/0070100 | A1* | 4/2003 | Winkler | G06F 21/32 |
| | | | | 709/225 |
| 2003/0105725 | A1* | 6/2003 | Hoffman | G06Q 20/042 |
| | | | | 705/50 |
| 2004/0146186 | A1* | 7/2004 | Gelbord | G06V 40/10 |
| | | | | 382/115 |
| 2007/0011466 | A1* | 1/2007 | Imura | G07C 9/33 |
| | | | | 713/186 |
| 2007/0150415 | A1* | 6/2007 | Bundy | H04L 9/0866 |
| | | | | 705/51 |
| 2007/0214093 | A1* | 9/2007 | Colella | G07C 9/257 |
| | | | | 705/67 |
| 2007/0250920 | A1* | 10/2007 | Lindsay | G06F 21/31 |
| | | | | 726/7 |
| 2008/0028230 | A1* | 1/2008 | Shatford | H04L 9/3231 |
| | | | | 713/186 |
| 2010/0049659 | A1* | 2/2010 | Cassone | G06F 21/32 |
| | | | | 705/64 |
| 2011/0126024 | A1* | 5/2011 | Beatson | H04L 9/3226 |
| | | | | 713/186 |
| 2012/0005732 | A1* | 1/2012 | Shinzaki | G06F 21/32 |
| | | | | 726/6 |
| 2014/0229388 | A1* | 8/2014 | Pereira | G06Q 20/20 |
| | | | | 705/76 |
| 2016/0269411 | A1* | 9/2016 | Malachi | H04L 63/0421 |
| 2017/0063851 | A1* | 3/2017 | Kim | H04L 63/0861 |
| 2017/0147864 | A1* | 5/2017 | Ahn | G06V 40/13 |
| 2017/0286656 | A1* | 10/2017 | Kohli | H04L 63/0428 |
| 2017/0289153 | A1* | 10/2017 | Raziel | H04L 63/0853 |
| 2017/0331631 | A1* | 11/2017 | Peeters | H04L 63/0435 |
| 2018/0068312 | A1* | 3/2018 | Kim | G06Q 20/40145 |
| 2018/0205725 | A1* | 7/2018 | Cronkright | G06F 16/951 |
| 2018/0316671 | A1 | 11/2018 | Brown | |
| 2019/0019190 | A1* | 1/2019 | Agrawal | G06Q 20/202 |
| 2019/0340344 | A1* | 11/2019 | Choi | G06F 21/83 |
| 2020/0089852 | A1* | 3/2020 | Manjappa | H04L 63/0861 |
| 2021/0392067 | A1* | 12/2021 | Nagayama | G05B 11/26 |
| 2022/0012740 | A1* | 1/2022 | Bacastow | G06Q 20/356 |

FOREIGN PATENT DOCUMENTS

| | | |
|---|---|---|
| KR | 1020140101322 | 8/2014 |
| KR | 1020170003348 | 1/2017 |

* cited by examiner

US 11,449,588 B2

ELECTRONIC DEVICE AND METHOD FOR CONTROLLING THE SAME

CROSS-REFERENCE TO RELATED APPLICATIONS

This application is the National Stage filing under 35 U.S.C. 371 of International Application No. PCT/KR2019/003135, filed on Mar. 18, 2019, the contents of which are hereby incorporated by reference herein in its entirety.

TECHNICAL FIELD

The present disclosure relates to an electronic device that is capable of performing multimodal biometric authentication.

BACKGROUND ART

With development of technologies, the functions of electronic devices are diversified. Examples of such functions include data and voice communications, capturing images and video via a camera, recording audio, playing music files via a speaker system, and displaying images and video on a display unit. Some electronic devices include additional functionality which supports electronic game playing, while other terminals are configured as multimedia players. Specifically, the recent electronic devices may receive broadcast and multicast signals providing visual contents such as videos or television programs.

As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

A broadened range of functions of the electronic device increases the importance of user authentication for enhancing security. For this user authentication, various schemes are used such as a password scheme and a biometric authentication scheme.

The biometric authentication is among security authentication schemes and is a technology that performs user authentication using peculiar physical features of user's fingerprint, face, voice, iris, retina, blood vessel, etc. This biometric recognition technology reduces the risk of illegal use or reproduction and increases the convenience in use.

Then, the biometric authentication scheme has an advantage in terms of the difficulty of falsification due to the use of user's biometric information, but has a problem that the greater the number pieces of biometric information that are a comparison group, the longer time it takes for the user authentication. Because of this, there is a problem in that the user authentication which uses user's authentication information is realistically difficult at an airport gate through which many users pass, a payment terminal for paying an amount of payment, or the like.

Furthermore, the advantage of the user authentication scheme that uses the biometric authentication information which is difficult to falsify is widely publicized, and thus a trend is that the number of biometric information that is the comparison group is further increased.

Research has been actively made on biometric authentication schemes that are capable of performing user's authentication at a high speed using the biometric authentication information that is difficult to falsify.

DISCLOSURE

Technical Problem

An object of the present disclosure, which is made in view of the problems described above and other problems, is to provide an electronic device that is capable of performing user authentication which uses biometric authentication information at a high speed and a function in accordance with a result of the user authentication even in a case where the number of pieces of biometric information that is a comparison group is great, and a method of controlling the electronic device.

Technical Solution

According to aspect of the present disclosure, there is provided an electronic device including: a terminal unit that includes multiple sensors which are formed to detect biometric information, and at least one terminal which includes an input unit formed to receive a personal identification number as an input; a controller that receives the personal identification number and the biometric information sensed from a user, from the terminal unit, and registers the received biometric information, as biometric authentication information corresponding to the personal identification number received together, in an authentication information database, when performing new user registration, and that selects only pieces of biometric authentication information corresponding to the personal identification number, from among pieces of biometric authentication information stored in the authentication information database, and forms a comparison group for the user authentication, in order to shorten the time taken for user authentication, if the user's personal identification number and biometric information are input from the terminal unit, when performing the user authentication; and a security module that compares the comparison group and the biometric information that is input from the terminal unit and thus performs the user authentication.

In the electronic device, the controller may detects the number of pieces of biometric authentication information that correspond to the personal identification number which is input from the terminal unit, in the authentication information database, and, in a case where the detected number is a preset number or greater, may receive any other personal identification number, as an input, from the user, when performing the new user registration.

In the electronic device, the controller may identify types of pieces of biometric authentication information that correspond to the personal identification number input from the terminal unit, in the authentication information database, may detect the number of pieces of biometric authentication information that correspond to the user-selected type of the biometric information, which are among pieces of biometric authentication information of which types are identified, and, in a case where the detected number is a preset number or greater, may receive any other type of biometric information, which is selected by the user, if a type of the biometric information that is to be input by the user is selected, when performing the new user registration.

In the electronic device, the reset number may be decided according to the time taken for comparing the user's biometric information that is input from the terminal unit, and any one of the pieces of biometric authentication information included in the comparison group, and a maximum allowance time that is preset for high-speed user authentication.

In the electronic device, the controller may decide the order of authentication according to user's selection and may register pieces of biometric information that are input from the terminal unit, as first biometric authentication information and second biometric authentication information, when performing the new user registration, and may control an operation of the electronic device according to a result of the user authentication that sequentially compares the biometric information that is input from the terminal unit with the first biometric authentication information and the second biometric authentication information, when performing the user authentication, and the security module may decide whether or not the remaining part of the user authentication is performed, based on the result of the user authentication in accordance with the first biometric authentication information.

In the electronic device, the controller may further receive user's personal information together with the personal identification number and the biometric information sensed from the user from the terminal unit, when performing the new user registration, and may detect the user's personal information, may apply a discounted rate to an amount of payment according to the detected user's personal information, and may make a payment of the discounted amount, based on the user's personal identification number and biometric information that are input from the terminal unit, when performing the user authentication for payment.

In the electronic device, the controller may issue to the user an authentication registration card that includes registered biometric authentication information and a personal identification number corresponding to the biometric authentication information, if the biometric authentication information corresponding to the personal identification number is registered, when performing the new user registration.

In the electronic device, the authentication registration card may be an electronic card that includes the biometric authentication information that is encrypted into the personal identification number.

In the electronic device, the controller may detect whether or not preregistered biometric authentication information having the same personal identification number is present, and, in a case where the preregistered biometric authentication information having the same personal identification number is present as a result of the detection, may group pieces of biometric information received from the terminal unit, as pieces of biometric authentication information that belong to the same group as the preregistered pieces of biometric authentication information, and may store the resulting pieces of biometric information, if the person identification number and the biometric information sensed from the user are received from the terminal unit, when performing the new user registration.

According to another aspect of the present disclosure, there is provided a method of controlling an electronic device, the method including: a first step of receiving personal identification information and biometric information through a first terminal included in the electronic device, when performing new user registration; a second step of storing the received biometric information, as biometric authentication information corresponding to the personal identification information received together, in an authentication information database; a third step of acquiring user's personal identification information and user's biometric information through a second terminal included in the electronic device, when performing user authentication; a fourth step of selecting pieces of biometric authentication information that correspond to the personal identification information which is input through the second terminal, from among pieces of biometric authentication information stored in the authentication information database; a fifth step of setting the pieces of biometric authentication information selected in the fourth step, as a comparison group for the user authentication; and a sixth step of comparing each of the pieces of biometric authentication information included in the comparison group and the biometric information acquired through the second terminal and thus performing the user authentication.

In the electronic device, the first terminal and the second terminal may be one terminal.

Advantageous Effect

An electronic device and a method of controlling the electronic device according to the present disclosure are described as follows.

According to at least one of the embodiments of the present disclosure, there is provided an advantage that a size of a biometric information comparison group that is used when performing biometric authentication is reduced and thus that high-speed biometric authentication is possible.

MODES FOR CARRYING OUT THE PREFERRED EMBODIMENTS

Figure 1A:
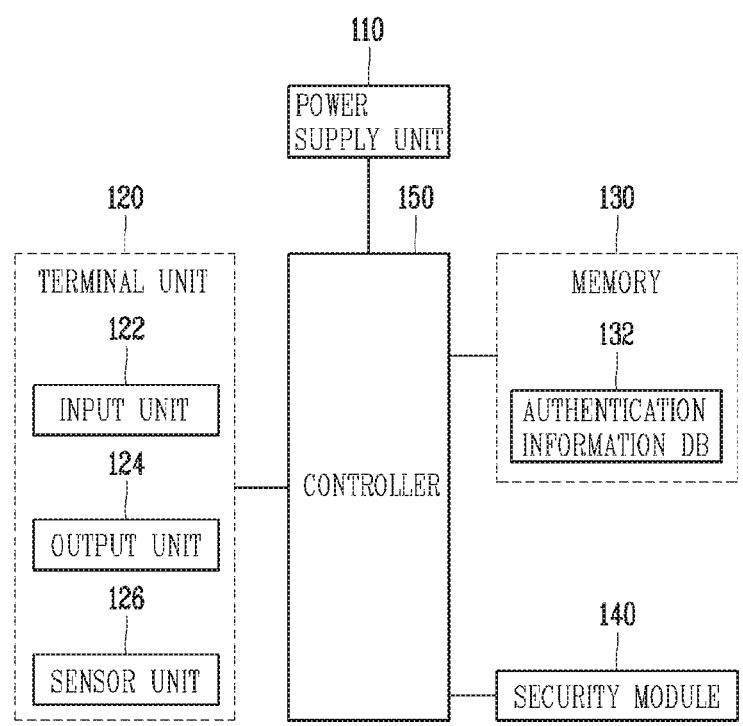
FIG. 1A is a block diagram for describing an electronic device according to the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), smart vehicles, and the like.

By way of non-limiting example only, further description will be made with reference to particular types of mobile electronic apparatuses. However, such teachings apply equally to other types of terminals, such as those types noted above. In addition, these teachings may also be applied to stationary electronic apparatuses such as digital TV, desktop computers, digital signage, and the like.

Figure 1B:
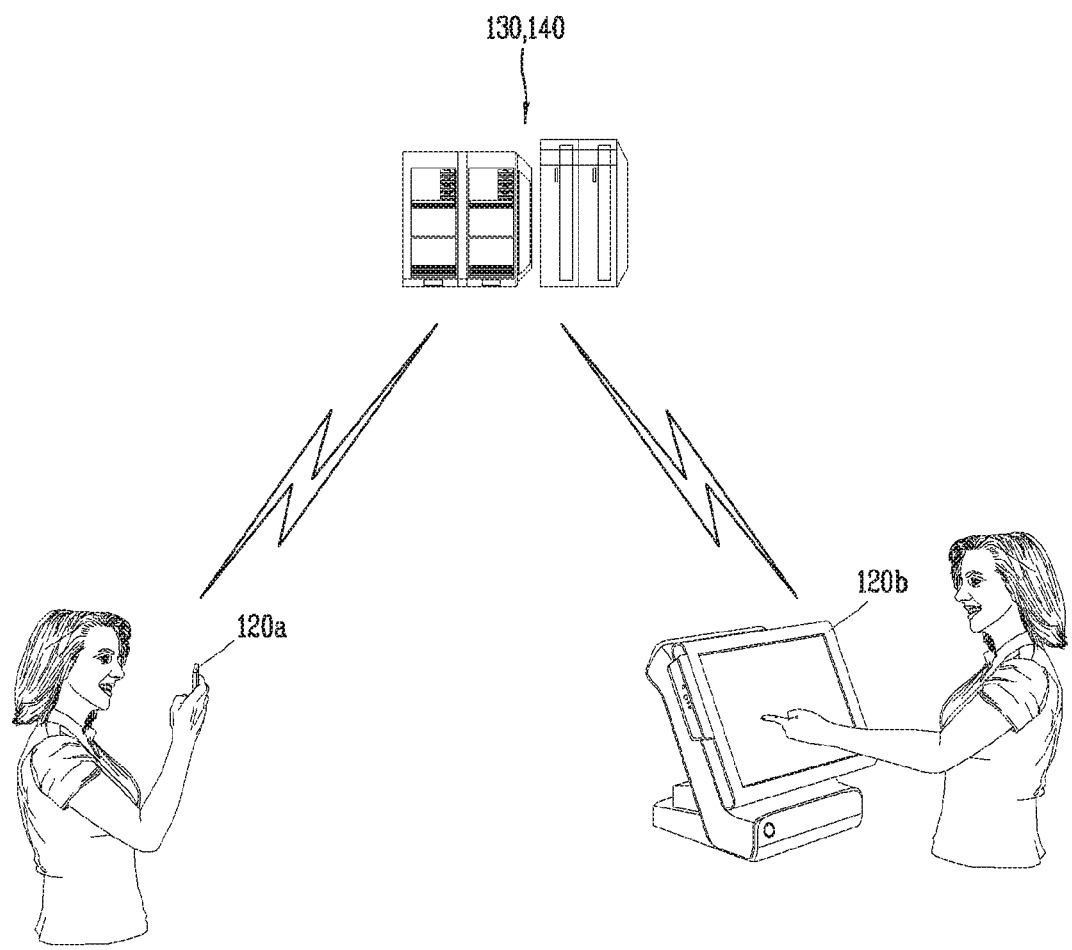
FIG. 1B is a conceptual diagram illustrating an example in which biometric information acquired from a user is registered with the electronic device according to the present disclosure and in which user authentication is performed according to the registered biometric information.

FIG. 1A is a block diagram for describing an electronic device according to the present disclosure. Then, FIG. 1B is a conceptual diagram illustrating an example in which biometric information acquired from a user is registered with the electronic device according to the present disclosure and in which user authentication is performed according to the registered biometric information.

With reference to FIG. 1, the electronic device according to the present disclosure includes power supply unit 110, a terminal unit 120, a memory 130, a security module 140, a controller 150, and so on. Constituent elements that are illustrated in FIG. 1 are not essential in implementing an electronic device, and thus an electronic device that is not described in the present specification may include constituent elements in addition to the constituent elements described above or may include one or more of the constituent described above.

More specifically, the terminal unit 120 includes at least one module for receiving information, as an input, from a user. For example, the terminal unit 120 includes a camera or an image input unit for inputting an image signal, a microphone or audio input unit for inputting an audio signal, and a key input unit (for example, a touch key, a mechanical key, or a touch screen). The modules for receiving an input from the user are hereinafter collectively referred to as an input unit 122.

In addition, the terminal unit 120 includes at least one module for generating an output associated with a sense of sight, a sense of hearing, or the like. As an example, the terminal unit 120 includes at least one of a display unit, an audio output unit, and an optical output unit. The display unit here is structurally layered with the touch sensor or is formed to be integrally combined with the touch sensor in order to implement a touch screen. The touch screen functions as an input interface between an electronic 100 and the user and at the same time functions as an output interface between the electronic device 100 and the user. At least one module that generates the output associated with the sense of sight, the sense of hearing, or the like is hereinafter referred to an output unit 124.

In addition, the terminal unit 120 includes at least one biometric sensor for acquiring the biometric information from the user. As an example, the biometric sensor includes at least one of a fingerprint sensor, an iris sensor, a facial recognition sensor, a photoplethysmography sensor (PPG), and a voice sensor. The biometric sensor acquires the biometric information (information on a fingerprint, an iris, a facial image, a heart rate, or the like) from the user. At least one biometric sensor is hereinafter referred to as a sensor unit 126.

On the other hand, an electronic device 100 according to the embodiment of the present disclosure includes at least one terminal unit 120. As an example, each of the terminal units 120 is connected to a controller 150 and transfers user information that is input from the input unit 122 and the biometric information that is acquired from the sensor unit 126 to the controller 150. In addition, under the control of the controller 150, image information or audio information is output through the output unit 124.

On the other hand, of course, as illustrated in FIG. 1B, the terminal unit 120 may be connected to the controller 150 from a long distance or a short distance, using a preset communication scheme. As an example, the terminal unit 120 is connected to the controller 150, using a short-distance communication scheme, such as Bluetooth (BT) or near-field communication (NFC), a wireless Internet scheme, such as Wireless LAN (WLAN) or Wireless-Fidelity (Wi-Fi), a mobile communication scheme, such as Global System for Mobile Communication (GSM), Code Division Multiple Access (CDMA), Long Term Evolution (LTE), Long Term Evolution-Advanced (LTE-A), or a 5G network (a new radio or a MilliMeter (MM) wave), or the like. To do this, although not illustrated, each terminal unit 120 includes a communication unit (not illustrated) for communication with the controller 150.

On other hand, the terminal unit 120 is connected to the controller 150 for communication, and the terminal units 120 include various electronic devices each of which includes the input unit 122, the output unit 124, and the sensor unit 126.

An example of the terminal unit 120 is a mobile terminal of the user. In this case, a touch screen and a speaker of the mobile terminal is the output unit 124, and a keypad (or a touch key pad) or the like is the input unit 122. In addition, a camera, a fingerprint recognition sensor, or the like that is capable of recognizing the iris or face of the user, which is provided in the mobile terminal, is the sensor unit 126. Furthermore, the terminal unit 120 may be a terminal that is installed at an immigration checkpoint or the like in an airport or may be a payment terminal (for example, a point-of-sales (POS) terminal).

As illustrated in FIG. 1B, each of the mobile terminal of the user and the payment terminal is accordingly connected, as the terminal unit 120, to the controller 150.

In this case, the user inputs the biometric information through the mobile terminal. In this case, the mobile terminal is used as a registration terminal 120*a* for registering the biometric information. Then, user's biometric information that is input through the registration terminal 120*a* is transferred to the controller 150. Then, the controller 150 stores the biometric information in a biometric information database in the memory 130 and performs registration of the biometric information.

On the other hand, in a case where, for payment, the user inputs the biometric information into any other POS terminal, that POS terminal is used as an authentication terminal 120*b* that performs user authentication, based on the biometric information that is input. Then, the authentication terminal 120*b* senses user's biometric information, and performs the user authentication based on the sensed biometric information and the biometric information preregistered in the biometric information database in the memory 130. Then, according to a result of the user authentication, a requested function (for example, a payment function) is performed.

On the other hand, pieces of data that are used for various functions of the electronic device 100 are stored in the memory 130. Many application programs (or applications) that run on the electronic device 100 and pieces of data and command for operations of the electronic device 100 are stored in the memory 130. At least one or several of these application programs is downloaded from an external server through wireless communication. At least one or several of these application programs are preinstalled on the electronic device 100 before shipment such that basic functions (for example, functions of receiving and making a call and functions of receiving and transmitting a message) of the electronic device 100) are performed. On the other hand, the application program is stored in the memory 130. Then, the application program is installed on the electronic device 100 and runs by the controller 150 to perform the operation (or the function) of the electronic device.

In addition, an authentication information database 132 in which information associated with biometric authentication is stored is included in the memory 130. At least one piece of biometric information and user's personal information that are input from a registration terminal 120*a*, and personal identification information (for example, PIN information) are stored in the authentication information database 132 here.

On the other hand, the authentication information database 132 is a database in which different users' preregistered pieces of biometric information are categorized according to a preset string of characters and then are stored. The string of characters here is personal identification information (PIN information) that is input from each of the users. That is, the different users' preregistered pieces of biometric information are grouped into groups according to the PIN information that are input from the users, that is, a string of numbers, and are stored in the authentication information database 132.

In this case, if strings of numbers that make up the PIN information that is input are the same or similar, that strings of numbers, although they are different users' pieces of biometric information, are grouped into one group, and the resulting one group is stored. At this point, in the case where the strings of numbers that make up the PIN information are the same, this means that numbers that make up the PIN information are all the same in arrangement. In addition, in the case where the strings of numbers are similar, this means that a preset number of numbers or greater which are among the numbers that make up the PIN information are the same in arrangement.

On the other hand, normally, the controller 150 controls general operations of the electronic device 100. The controller 150 may provide or process information or functions appropriate for a user by processing signals, data, information and the like, which are input or output by the aforementioned various components, or activating application programs stored in the memory 130.

Also, the controller 150 may control at least some of the components illustrated in FIG. 1A, to execute an application program that have been stored in the memory 130. In addition, the controller 150 may control a combination of at least two of those components included in the electronic device 100 to activate the application program.

In a case where a request is made for registration of the biometric information through the registration terminal 120*a*, the controller 150 receives the biometric information that is sensed in the registration terminal 120*a*. The registration terminal 120*a* here means an electronic device that is connected to the controller 150 for the registration of the biometric information. Therefore, in a case where the user connects his/her mobile terminal to the controller 150 for the registration of the biometric information, the mobile terminal of the user is the registration terminal 120*a*.

On the other hand, when the biometric information that is sensed in the registration terminal 120*a* is received, the controller 150 makes a request for user's PIN information (the personal identification information) for managing the biometric information. The PIN information here is made up of multiple numbers.

When the PIN information is input, the controller 150 categorizes received pieces of biometric information based on the arrangement of numbers that make up the PIN information that is input, and stores a result of the categorization. As an example, the controller 150 detects whether or not preregistered pieces of information are present that correspond to a string of numbers that is the same as or similar to an arrangement of numbers that make up currently-input PIN information. Then, currently-input pieces of biometric information are grouped together with the preregistered pieces of biometric information that correspond to the same or similar string of numbers and are stored. In a case where the preregistered pieces of information are not present that correspond to the string of numbers that is the same as or similar to the arrangement of numbers that make up the currently-input PIN information, the controller 150 generates a new group and stores the currently-input biometric information.

In addition, in a case where a request is made for authentication of the biometric information through the authentication terminal 120*b*, the controller 150 receives the biometric information that is sensed in the authentication terminal 120b. The authentication terminal 120b here means an electronic device that is connected to the controller 150 for the user authentication. Therefore, in a case where the POS terminal for payment is connected to the controller 150, the POS terminal is the authentication terminal 120b.

On the other hand, the controller 150 acquires the PIN information together with the user's biometric information through the authentication terminal 120b. Then, the controller 150 sets a biometric authentication comparison group based on the acquired PIN information. As an example, the controller 150 detects pieces of biometric information that correspond to a string of numbers that is the same as or similar to an arrangement of numbers that make up the acquired PIN information. Then, the detected pieces of biometric information are set as the biometric authentication. As an example, the controller 150 detects biometric information groups that correspond to the same as or similar to the arrangement of numbers that make up the acquired PIN information and sets the detected biometric information groups as the biometric authentication comparison groups.

Then, the controller 150 controls the security module 140 such that the user authentication is performed on only currently-set biometric authentication comparison group, which is among pieces of biometric information stored in the authentication information database 132. Then, the security module 140 performs the user authentication on the biometric information acquired through the authentication terminal 120b and on the currently-set biometric authentication comparison group using a preset algorithm.

The security module 140 controls an operation associated with the user authentication, which are among the operations of the electronic device. For example, when a biometric authentication function is performed, the security module 140 performs control associated with the biometric authentication. For example, the security module 140 performs the biometric authentication using an artificial neural network algorithm and a support vector machine (SVM) algorithm, which are algorithms for the biometric authentication. Besides, the security module 140 operates a fuzzy logic, a Dempster-Shafer theory, a SVM, a relevance vector machine (RVM) mean rule, a Monte Carlo approach, phase stretch transform (PST), an artificial neural network, a principal component analysis, Fisher faces, wavelet and elastic matching, and so on, which are algorithms for the biometric authentication.

The security module 140 transmits and receives data through communication with the controller 150 and thus controls general operations of the electronic device. For example, the controller 150 receives data that results from the user authentication, from the security module 140, and based on this data, controls the operations of the electronic device. In addition, the security module 140 receives a control command for performing the biometric authentication from the controller 150 and accordingly performs the biometric authentication.

On the other hand, in FIG. 1A, a configuration is illustrated in which the security module 140 and the controller 150 are separated from each other, but the present disclosure is not limited to this. A configuration may be employed in which the security module 140 is one portion of the controller 150.

Various embodiments described herein may be implemented in a computer-readable medium, a machine-readable medium, or similar medium using, for example, software, hardware, or any combination thereof.

Figure 2:
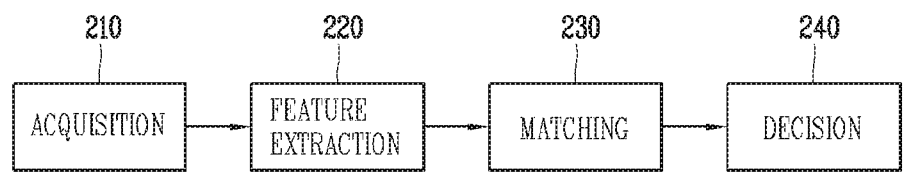
FIG. 2 is a conceptual diagram for a unimodal biometric authentication scheme.

A method of performing the biometric authentication in the electronic device described with reference to FIG. 1A will be described in detail below. FIG. 2 is a conceptual diagram for describing a unimodal biometric authentication scheme.

Referring to FIG. 2, unimodal biometric authentication includes an acquisition step 210, a feature extraction step 220, a matching step 230, and a decision step 240.

In the acquisition step 210, biometric recognition information is acquired through a biometric sensor. Pieces of biometric recognition information include pieces of user-specific biometric information such as fingerprint information, facial information, voice information, vein information, iris information, and the like.

In the feature extraction step 220, features of the biometric recognition information are extracted. The feature is information for recognizing a specific characteristic that varies from one person to another. For example, in the case of the fingerprint, a specific pattern of a fingerprint is set as a feature. This feature is is differently set depending on biometric authentication schemes.

In the matching step 230, a matching score between preregistered user information and detected biometric recognition information may be calculated. The preregistered user information is biometric information that is stored in advance by the user before performing the biometric authentication. The user stores in advance the fingerprint information, the facial information, the voice information, the vein information, the iris information, and so on in the form of template in the memory 170.

The matching score refers to a score indicating similarity between the preregistered user information and the biometric recognition information. Various algorithms that are known in the related art are used as algorithms for calculating the matching score.

In the decision step 240, the user authentication is performed using the matching score and a decision function. The decision function is a function that serves as a reference for determining whether or not the user who inputs the biometric recognition information is a genuine user or an imposter user. The decision function may be set as a specific threshold or may be set as a multi-dimensional function.

An initial setting value (default value) may be set, by a manufacturer of a biometric authentication function, for the decision function. In addition, the initial setting value for the decision function may be changed using user's pieces of biometric recognition information, which are detected through biometric sensors. Therefore, the more the electronic device performs biometric recognition operation, the more the speed and the precision of the biometric recognition are improved.

In addition, decision functions may be generated differently from each other according to pieces of information that are used for generating the decision functions. Then, multiple decision functions that are generated differently from each other may be stored in the memory 170. For example, a decision function may be generated with only the matching score or may be generated using the matching score and a spoofing score. In this case, two decision functions may be both stored in the memory 170, and, whenever necessary, the biometric authentication may be performed using one of the two decision functions.

The unimodal biometric authentication scheme has been described above. A multimodal biometric authentication scheme will be described below. FIGS. 3A to 3D are conceptual views illustrating a multimodal biometric authentication scheme.

Multimodal biometric authentication may be categorized into 4 types according to when multiple pieces of biometric recognition information are fused. The term fusion is used to mean an operation of combing multiple pieces of information into one piece of information according to a preset algorithm and may be used interchangeably with the terms combination, integration, fusion, matching, and so on.

Figure 3A:
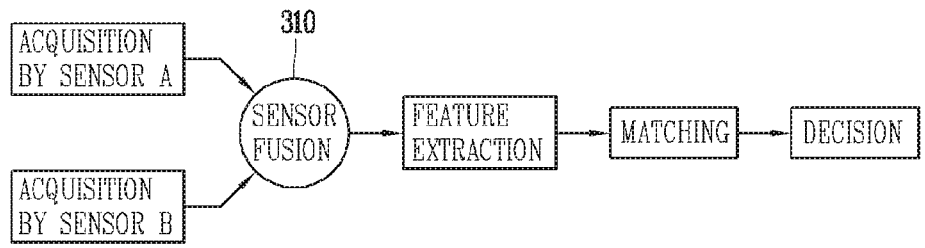
FIGS. 3A to 3D are conceptual diagrams for describing a multimodal biometric authentication scheme.

FIG. 3A illustrates a sensor fusion scheme 310. The sensor fusion scheme 310 is a scheme for combining multiple pieces of biometric recognition information that are acquired from different sensors in the step of acquiring the biometric recognition information. Specifically, the sensor fusion scheme is a scheme for fusing pieces of biometric recognition information sensed by different biometric sensors and extracting a feature from information that results from the fusion.

Figure 3B:
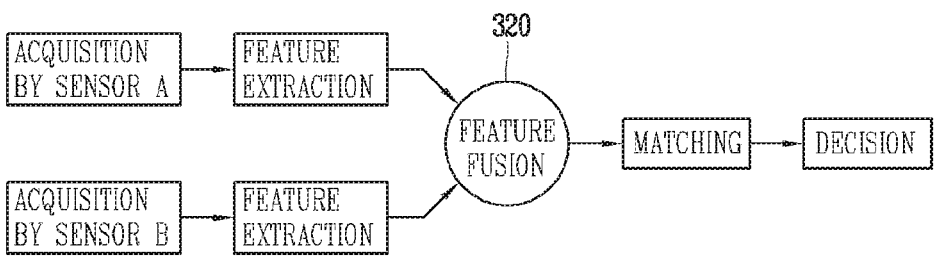

FIG. 3B illustrates a feature fusion scheme 320. The feature fusion scheme 320 is a scheme for extracting a feature from each of the multiple pieces of biometric recognition information acquired from the different biometric sensors in the feature extraction step and combining the extracted features.

Figure 3C:
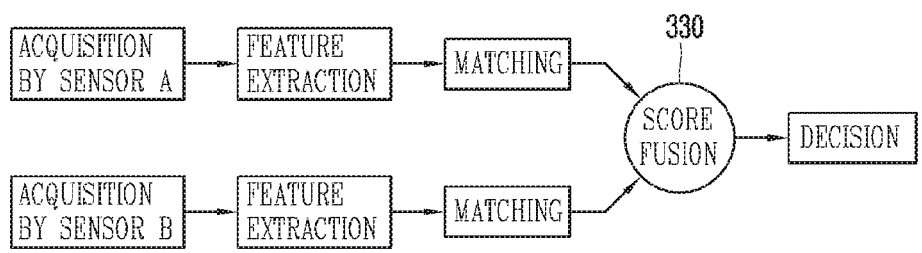

FIG. 3C illustrates a score fusion scheme 330. The score fusion scheme 330 is a scheme for combining matching scores that are calculated for the multiple pieces of biometric recognition information, respectively, in the step of matching pieces of biometric recognition information.

Figure 3D:
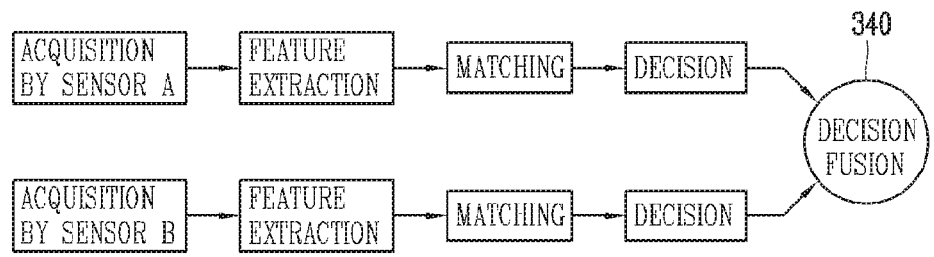

FIG. 3D illustrates a decision fusion scheme 340. The decision fusion scheme 340 is a scheme for combining results of decision that are calculated for the multiple pieces of biometric recognition information, respectively, in the step of deciding the biometric recognition information.

Figure 4A:
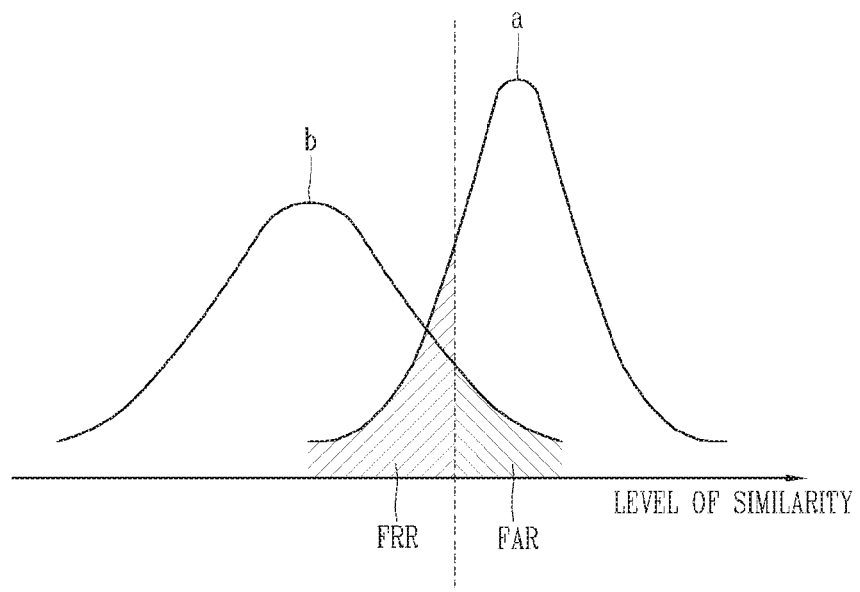
FIGS. 4A and 4B are graphs associated with an error rate of decision of biometric authentication.
Figure 4B:
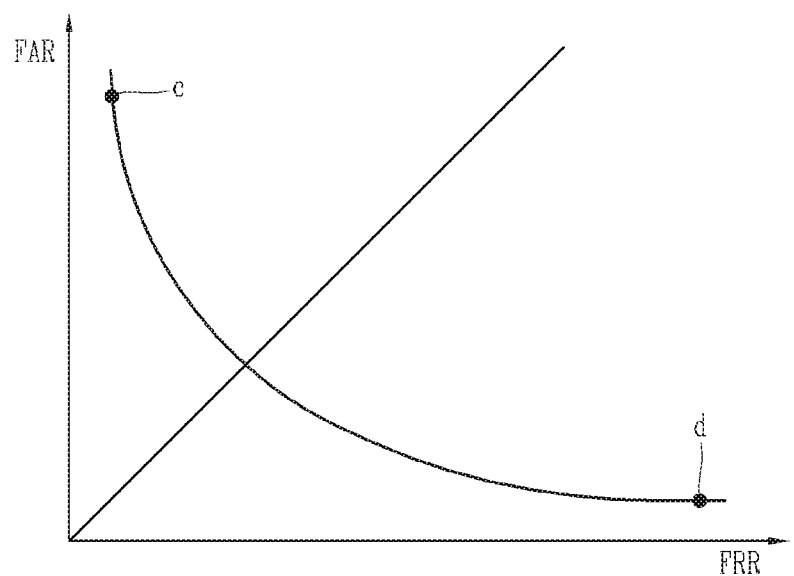

The various schemes for the multimodal biometric authentication have been described above. An error rate of the biometric recognition associated with the function of decision when performing the user authentication through the biometric authentication will be described below. FIGS. 4A and 4B are graphs associated with an error rate of decision of the biometric authentication.

Graph a in FIG. 4A is a graph illustrating distribution of levels of similarity between genuine user's biometric information and the preregistered user information, when performing the biometric authentication. Graph b in FIG. 4A is a graph illustrating distribution of levels of similarity between imposter's biometric information and the preregistered user information.

There is a portion of overlap between Graph a and Graph b. In a case where a level of similarity that is higher than a threshold indicated by a dot line aa' is reached, the electronic device 100 determines that the user is a genuine user. In a case where the level of similarity is lower than the threshold, the electronic device 100 determines that the user is an imposter user. The threshold here may be a value that is decided by a provider that provides the biometric authentication function, and means the decision function described above.

On the other hand, a false rejection rate (FRR) that is illustrated in FIG. 4A refers to a rate at which the genuine user is determined as an imposter. The higher the FRR, the higher the threshold. This decreases the probability that the user who inputs the biometric recognition information will be determined as a genuine user. Because of this, the level of security of the biometric authentication increases. The lower the FRR, the lower the threshold. This increases the probability that the user who inputs the biometric recognition information will be determined as a genuine user. Because of this, the level of security of the biometric authentication decreases.

A false acceptance rate (FAR) refers to a rate at which the imposter user is determined as a genuine user. The concept of the FAR is opposite to that of the FRR. The higher the FAR, the lower the threshold. This increases the probability that the user who inputs the biometric recognition information will be determined as a genuine user. Because of this, the level of security of the biometric authentication decreases.

FIG. 4B is a graph illustrating a relationship between the FRR and the FAR. The FRR and the FAR are inversely proportional to each other. A threshold that corresponds to an area d where the FRR is high and the FAR is low is used for applications that provide a low authentication speed but require a high degree of security. For example, the threshold that corresponds to this area is set for a payment application and a bank application for strictly determining the genuine user. Conversely, a threshold that corresponds to an area c where the FRR is low and the FAR is high is used for applications that provide a high authentication speed and require a low level of security. For example, the threshold that corresponds to this area is used for an unlocking function and so on. In this manner, a threshold (that is, the decision function) of the biometric authentication function is decided considering a level of security of each of the functions that are to be performed through the biometric authentication. The parameters relating to the errors that results when performing the biometric authentication are described above.

An algorithm that is used for the score fusion scheme that is among the multimodal biometric authentication schemes will be described below.

For the score fusion scheme, various artificial intelligence algorithms for combining matching scores are used. Algorithms that are used for the score fusion scheme may include combination-based score fusion algorithms, classifier-based score fusion algorithms, density-based score fusion algorithms, and so on.

The combination-based score fusion algorithms may include a statistical rule, dynamic weighting, triangular norms, and so on. The classifier-based score fusion algorithms may include a support vector machine (SVM), Ada-Boost (RS-ADA), Dampster-Shafer (DS) and so on. The density-based score fusion algorithms may include a likelihood feature (LF) and so on.

Besides, according to the present disclosure, various algorithms and so on that are known in the related art are used for the score fusion scheme, and descriptions thereof are omitted in order not to depart from the nature and gist of the present disclosure.

The constituent elements mentioned above will be described in detail below with reference to FIG. 1A before describing various embodiments that are implemented through the electronic device 100 described above.

Embodiments associated with a control method that is implemented in the electronic device which is configured in this manner will be described in detail below with reference to the accompanying drawings. It is apparent to a person of ordinary skill in the art that the present disclosure can be implemented in specific forms within the scope that does not depart from the nature and gist of the present disclosure and from the essential features of the present disclosure.

Figure 5:
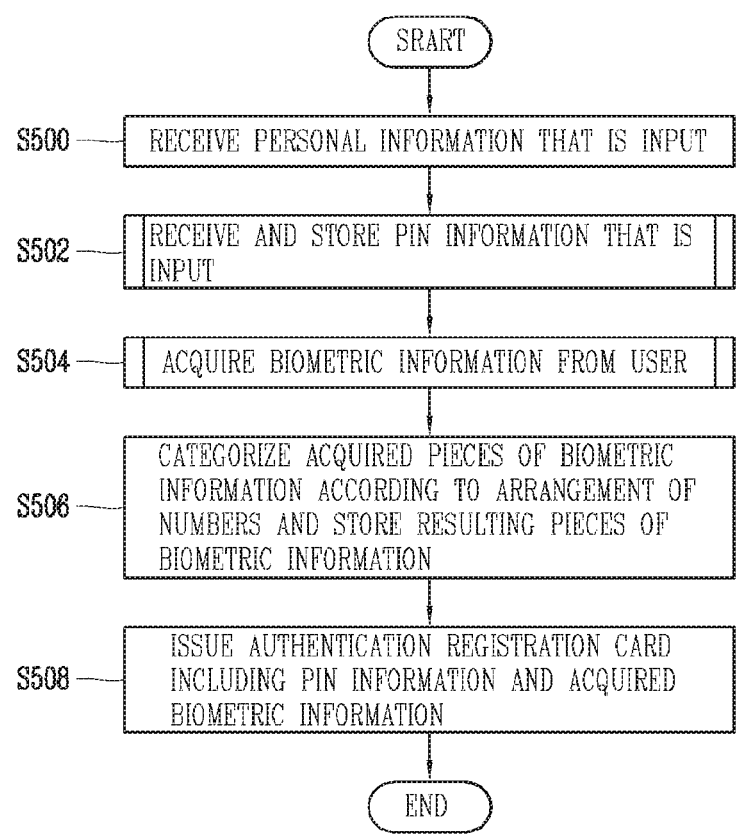
FIG. 5 is a flowchart illustrating a process in which a user registers his/her biometric information with the electronic device according to the present disclosure.

FIG. 5 is a flowchart illustrating a process in which the user registers his/her biometric information with the electronic device according to the present disclosure. A process in FIG. 5 is performed in a case where the registration terminal 120a is connected to the controller 150.

With reference to FIG. 5, first, the controller 150 of the electronic device 100 according to the present disclosure is described as receiving user's personal information that is input into the registration terminal 120a that is currently connected (S500). The personal information is user's individual personal information. As an example, the personal information includes a user's name and sex and so on and may further include pieces of information on a user's social status (for example, a student or the like), a user's credential (a person of national merit or the like), a user's age, and so on.

On the other hand, the personal information includes information associated with a user's payment means. As an example, the information associated with the payment means includes information on a credit card, information on a payment account, and so on.

Then, the controller 150 receives the PIN information that corresponds to the personal information which is input, as an input (S502). The PIN information is made up of multiple characters that are preferred by the user. It is more desirable that the PIN information is made up of multiple numbers.

When the PIN information is input in Step S502, the controller 150 acquires the user's biometric information that is sensed through the registration terminal 120a (S504). At this point, pieces of biometric information are two or greater in number. The two or more pieces of biometric information are pieces of biometric information for performing the user identification according to different biometric authentication schemes (for example, first biometric information is fingerprint information, and second biometric information is iris authentication information).

Then, the controller 150 categories the acquired pieces of biometric information according to the PIN information that is received in Step S502 and stores the resulting pieces of biometric information (S506). In more detail, the controller 150 groups the pieces of biometric information acquired in S504 in a manner that corresponds to an arrangement of numbers that make up the PIN information and stores the resulting pieces of biometric information.

At this point, in a case where preregistered pieces of biometric information are present that correspond to an arrangement of numbers which are the same as or similar to the arrangement of numbers that make up the PIN information, the controller 150 categorizes the preregistered pieces of biometric authentication information and the pieces of biometric information acquired in Step S504 into one group and stores the resulting one group. Then, the pieces of biometric information acquired in Step S504 are registered, as pieces of biometric authentication information for the user authentication, in the authentication database 132.

The preregistered pieces of biometric information here are pieces of biometric information that correspond to a user who is different from the user who corresponds to the biometric information acquired in Step S504. That is, the controller 150 of the electronic device 100 according to the embodiment of the present disclosure groups the different users' pieces of biometric information into one group according to a string of numbers that is input together with the biometric information and manages the resulting one group.

On the other hand, when the biometric information is registered in the authentication information database 132, the controller 150 issues authentication registration card including information associated with the registered biometric information (S508). The authentication registration card here includes information that results from coding the registered biometric information. In addition, information on a path for the biometric information registered in the authentication information database 132 is included. That is, the authentication registration card includes the coded biometric information itself or information on a path for accessing the user's registered biometric information.

On the other hand, the authentication registration card is configured to be activated based on the PIN information that is input in Step S502. That is, the authentication registration card is kept in an inactivated state where access to the included pieces of information is blocked, and in a case where preregistered PIN information (PIN information that is the same as the PIN information that is input in Step S502), switches to an activated state. Then, in a case where the authentication registration card is activated, the access to the information (the coded biometric information itself or the information on the path for accessing the registered biometric information) included in the authentication registration card is allowed.

On the other hand, the authentication registration card is issued in the form of an electronic card that can be stored in the electronic device. In this case, in a case where the registration terminal 120a is the mobile terminal of the user, the authentication card is stored in the mobile terminal of the user.

Figure 6:
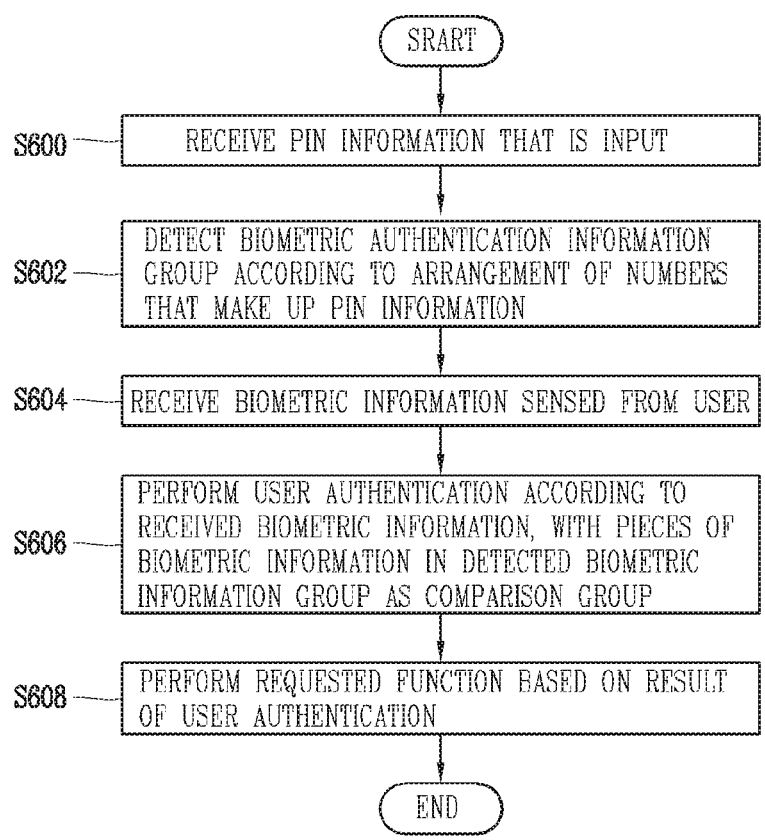
FIG. 6 is a flowchart illustrating a process in which the user authentication and a function associated with the user authentication are performed in the electronic device according to the present disclosure, based on the biometric information that is sensed from the user.

On the other hand, FIG. 6 is a flowchart illustrating a process in which the user authentication and a function associated with the user authentication are performed in the electronic device 100 according to the present disclosure, based on the biometric information that is sensed from the user. A process in FIG. 6 is performed in a case where the authentication terminal 120b that makes a request for the user authentication for payment is connected to the controller 150.

With reference to FIG. 6, the controller 150 of the electronic device 100 according to the embodiment of the present disclosure is described as receiving the PIN information that is input by the user, from the authentication terminal 120b (S600).

Then, the controller 150 detects at least one biometric authentication information group in accordance with an arrangement of numbers that make up the received PIN formation (S602). At this point, at least one biometric authentication information group in accordance with the arrangement of numbers that makes up the PIN information is a biometric authentication information group that corresponds to an arrangement of numbers which is the same as or similar to the arrangement of numbers that makes up the PIN information received in Step S602. The similar arrangement of numbers here means that a preset number of numbers or greater that are among numbers that make up the PIN information received in S600 are the same in arrangement.

As an example, in a case where the PIN information received in Step S600 is "7777777," pieces of biometric information that correspond to the PIN information "7777777" in the authentication database 132 are detected as one biometric authentication information group. In a case where, when arrangements of 5 consecutive numbers are the same, arrangements of numbers are regarded as being similar, pieces of biometric information that correspond to pieces of PIN information, respectively, each of which includes the arrangement of 5 consecutive numbers "77777," are detected as biometric authentication information groups that correspond to similar PIN information.

Then, the controller 150 receives the user's biometric information acquired in the authentication terminal 120b (S604). Then, the controller 150 sets the biometric authentication information groups detected in Step S602 as the comparison group for the user authentication. Then, with a biometric authentication information group that is currently set, the user authentication in accordance with the biometric information acquired in Step S604 is performed (S606).

On the other hand, as described above, according to the present disclosure, pieces of biometric information are grouped based on the PIN information that is input together with the biometric information when registering the biometric information, and the resulting pieces of biometric information are managed. That is, pieces of PIN information that correspond to pieces of biometric authentication information, respectively, that are stored in the authentication information database are included, pieces of biometric information are categorized, and the resulting pieces of biometric information are stored.

Thus, according to the present disclosure, one or several pieces of preregistered biometric authentication information are selected (detected) from among the pieces of preregistered biometric authentication information according to the PIN information that is input together with the biometric information when performing the user authentication. That is, only pieces of biometric authentication information that correspond to a string of numbers that is the same or similar to the string of numbers which make up the PIN information which is input in Step S600 are selected from among the pieces of biometric authentication information registered in the authentication database 132. Then, only selected pieces of biometric authentication information are set as the comparison group, and the user authentication in accordance with the biometric information that is input in Step S604 is performed. Thus, according to the present invention, the number of other pieces of biometric authentication information that are compared with the biometric information that is input for authentication can be greatly reduced, and thus the time taken for the user authentication can be greatly reduced.

Then, based on the result of the user authentication in Step S606, the controller 150 controls the terminal unit such that a currently-requested function is performed (S608). For example, in a case where the authentication terminal 120b is connected to the controller 150 (for example, the POS terminal) for payment through the user authentication, according to the result of the authentication, the authentication terminal 120b is controlled such that a payment is made, or the authentication terminal 120b is controlled such that the payment is interrupted. Alternatively, in a case where the authentication terminal 120b is connected to the controller 150 for user inquiry (for example, a terminal in an airport terminal), user' individual personal information in accordance with the result of the user authentication is displayed on the output unit 124.

On the other hand, in a case where the user authentication is not performed as a result of performing the user authentication in Step S606, of course, the controller 150 may make a request for other biometric information. Then, the authentication terminal 120b requests the user to input other biometric information. In this case, in a case where, among multiple pieces of biometric information that are input in Step S504 in FIG. 5, biometric information (the second biometric information) that has not yet been input is input, the controller 150 receives the second biometric information through the authentication terminal 120b.

Then, the controller 150 compares a currently-set comparison group (pieces of authentication information in the biometric authentication information groups that are detected in Step S602) and the second biometric information and again performs the user authentication.

On the other hand, the biometric information in Step S604 may be acquired using the authentication registration card. As an example, in a case where the authentication registration card is input or sensed through the authentication terminal 120b, the controller 150 receives information of the authentication registration card from the authentication terminal 120b. Then, the controller 150 makes a request to the user for the PIN information. Alternatively, the PIN information that is input in Step S600 may be reutilized.

On the other hand, the information of the authentication registration card is coded biometric authentication information or path information for accessing the user's biometric authentication information that is stored in the authentication database 132. Then, in a case where preset PIN information is input, the access to the information of the authentication registration card is possibly allowed. As an example, the information of the authentication registration card is information that is encrypted by the preset PIN information.

Then, the controller 150 accesses the information of the authentication registration card according to the PIN information. That is, in a case where the PIN information that is again input from the user or the PIN information that is input in Step S600 is matched with PIN information preset in the authentication registration card, the controller 150 accesses information stored in the authentication registration card. Thus, the controller 150 compares the coded biometric authentication information stored in the authentication registration card or the biometric authentication information in accordance with the path information with pieces of biometric authentication information in the currently-set comparison group and thus performs the user authentication. Accordingly, in a case where the biometric information corresponding to the reregistered biometric authentication information is difficult to provide using the authentication registration card, the user authentication and the function associated with the user authentication are also performed.

On the other hand, as a result of the user authentication in Step S606, the authentication terminal 120b acquires the user's personal information that is necessary. As an example, the authentication terminal 120b acquires user's credit card information or account information for payment.

The personal information here includes information on the user's social status or credential. Therefore, the authentication terminal 120b reflects information on the user's social status or credential, which is acquired when performing a function in accordance with the result of the user authentication.

As an example, in a case where a status of the user is an elementary school student, the authentication terminal 120b applies a discounted rate in accordance with an elementary school student status to an amount of payment when paying a charge and makes it possible to make a payment of the discounted amount of the charge. Alternatively, in a case where the status of the user is a person of national merit, the authentication terminal 120b applies a discounted rate for the person of national merit to the amount of payment when paying a charge and makes it possible to make a payment of the automatically-discounted amount of the charge.

On the other hand, as described above, in Step S602, the biometric authentication information groups that correspond to the arrangement of numbers that is the same as or similar to the arrangement of numbers that make up the PIN information are detected, but, in another manner, of course, only the biometric authentication information group corresponding to the arrangement of numbers that are the same as the arrangement of numbers that make up the PIN information may be detected. In this case, a size of the comparison group against which the acquired biometric information is compared is more decreased, and thus, of course, faster user authentication can be performed.

On the other hand, as described above, according to the present disclosure, the user authentication is not performed through the PIN information, and therefore, although the same PIN information is present, the user authentication is possible. Therefore, the user can set the PIN information more freely. For example, like a birth date or an arrangement of the same numbers, any string of numbers that is easy for the user to memorize is set as the PIN information.

On the other hand, as described above, the PIN information that is input in Step S502 in FIG. 5 is information for managing the biometric information to be registered. That is, the controller 150 of the electronic device 100 according to the embodiment of the present disclosure groups pieces of biometric information based on the string of numbers in accordance with the PIN information that is input, and stores the resulting pieces of biometric information. Then, when performing the user authentication, the controller 150 reduces a size of the biometric information comparison group that is to be set in subsequent user authentication, that is, the number of pieces of biometric information that are to be compared with the biometric information acquired in the authentication terminal, using the PIN information that is input.

Then, in a case where many users use the same PIN information, the number of pieces of biometric authentication information that correspond to a string of numbers that make up a specific PIN information is increased. Then, in a case where the PIN information is used, the size of the comparison group is also increased to a fixed size or greater, and in this case, there is a problem in that a user authentication speed that results when using the biometric authentication information is decreased.

Therefore, in a case where the number of the same pieces of PIN information is a fixed number or greater in a process of receiving and storing the PIN information in FIG. 5, of course, the controller 150 according to the embodiment of the present disclosure may alert the user that the user authentication speed will be slow and may guide the user through setting other PIN information.

Figure 7:
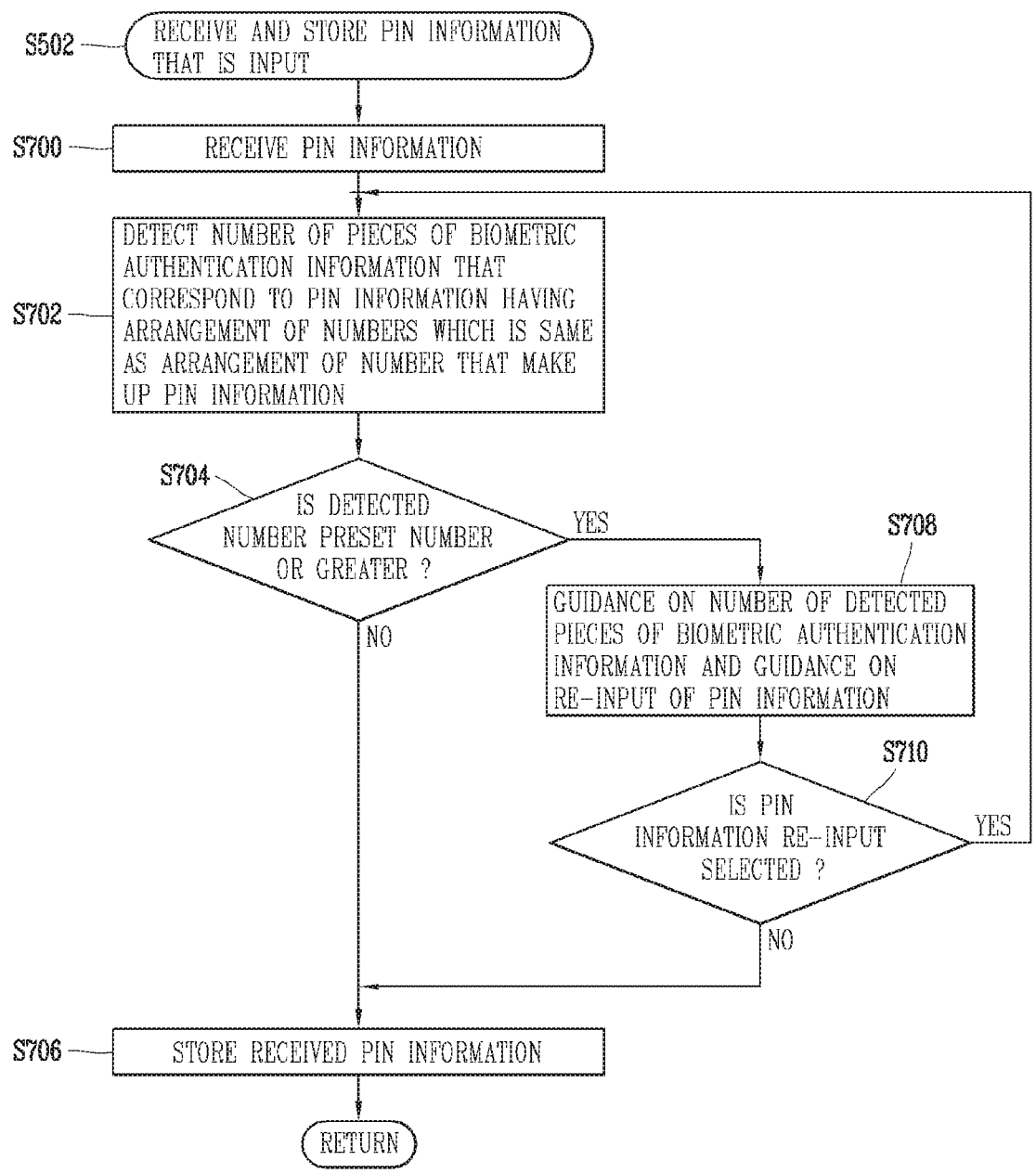
FIG. 7 is a flowchart illustrating in more detail operations of receiving and storing PIN information that is input, which is among the processes that are illustrated in FIG. 5.

FIG. 7 is a flowchart illustrating in more detail Step S502 in FIG. 5 in which, in this case, the PIN information is received and stored.

With reference to FIG. 7, the controller 150 of the electronic device 100 according to the embodiment of the present invention is described as receiving the PIN information that is input by the user through the registration terminal 120a (S700). Then, the number of preregistered pieces of biometric authentication information that correspond to the PIN information which has a string of numbers that is the same as the string of numbers which make up the received PIN information is detected (S702).

On the other hand, the controller 150 determines whether or not the number of pieces of biometric authentication information that are detected in Step S702 is a preset number or greater (S704). In a case where as a result of the determination in Step S704, the number of pieces of biometric authentication information that correspond to PIN information which is the same as the PIN information received in Step S700 is smaller than the preset number, the controller 150 stores the PIN information that is received in Step S700 (S706).

On the other hand, the "preset number" in Step S704 is decided according to the time taken for the use authentication. That is, the time taken for comparing the biometric information acquired in the authentication terminal 120b and any one of the pieces of biometric authentication information included in the comparison group, and the number of pieces of biometric authentication information in a maximum comparison group in accordance with a maximum allowance time for high-speed user authentication are calculated. Then, the calculated number is the "preset number" in Step S704.

On the other hand, in a case where, as a result of the determination in Step S704, the number of pieces of biometric authentication information that correspond to the PIN information which is the same as the PIN information received in Step S700 is the preset number or greater, the controller 150 controls the registration terminal 120a such that, for guiding, the user is provided with information on the currently-detected pieces of biometric authentication information.

As an example, under the control of the controller 150, the registration terminal 120a displays information on an estimated time taken for the user authentication in accordance with the number of currently-detected pieces of biometric authentication information. Then, the controller 150 outputs PIN re-input guidance information for recommending that the user input other PIN information (S708).

Then, the controller 150 checks whether or not the user selects re-input of the PIN information as a result of the output of the PIN re-input guidance information in Step S708 (S710). In a case where the PIN information is re-received through this PIN information re-input, the controller 150 determines that the user selects the re-input of the PIN information.

Then, the controller 150 proceeds back to Steps S702 and S704, detects the number of preregistered pieces of biometric authentication information that correspond to the PIN information that is the same as the PIN information that is again received, and determines whether or not the detected number is a preset number or greater. Then, according to a result of the determination, the controller 150 may proceed to Step S716 or may again perform Steps S708 to S710.

On the other hand, of course, regardless of the guidance information that is output in Step S708, input of currently-set PIN information may be maintained. That is, in a case where the user does not select the re-input of the PIN information in Step S710, the controller 150 proceeds to Step S706 and stores the PIN information received in Step S700.

On the other hand, as described above, according to the present disclosure, the size of the biometric authentication information comparison group for the user authentication is reduced and thus high-speed user authentication is performed.

Then, although pieces of biometric authentication information that correspond to the PIN information are selected, in a case where, among pieces of biometric authentication information that correspond to the same PIN information, there are many pieces of biometric authentication information of the same type, the number of pieces of comparison targets that are to be compared with the biometric information is still great and this is a main factor in decreasing the user authentication speed.

Therefore, in a process of acquiring the biometric information from the user and storing the acquired biometric information in FIG. 5, in a case where, among pieces of biometric information that correspond to currently-input PIN information, the number of pieces of biometric information in compliance with the user-selected scheme is a fixed number or greater, of course, the controller 150 according to the embodiment of the present disclosure may alert the user that the user authentication speed will be slow and may guide the user through inputting any other type of PIN information.

Figure 8:
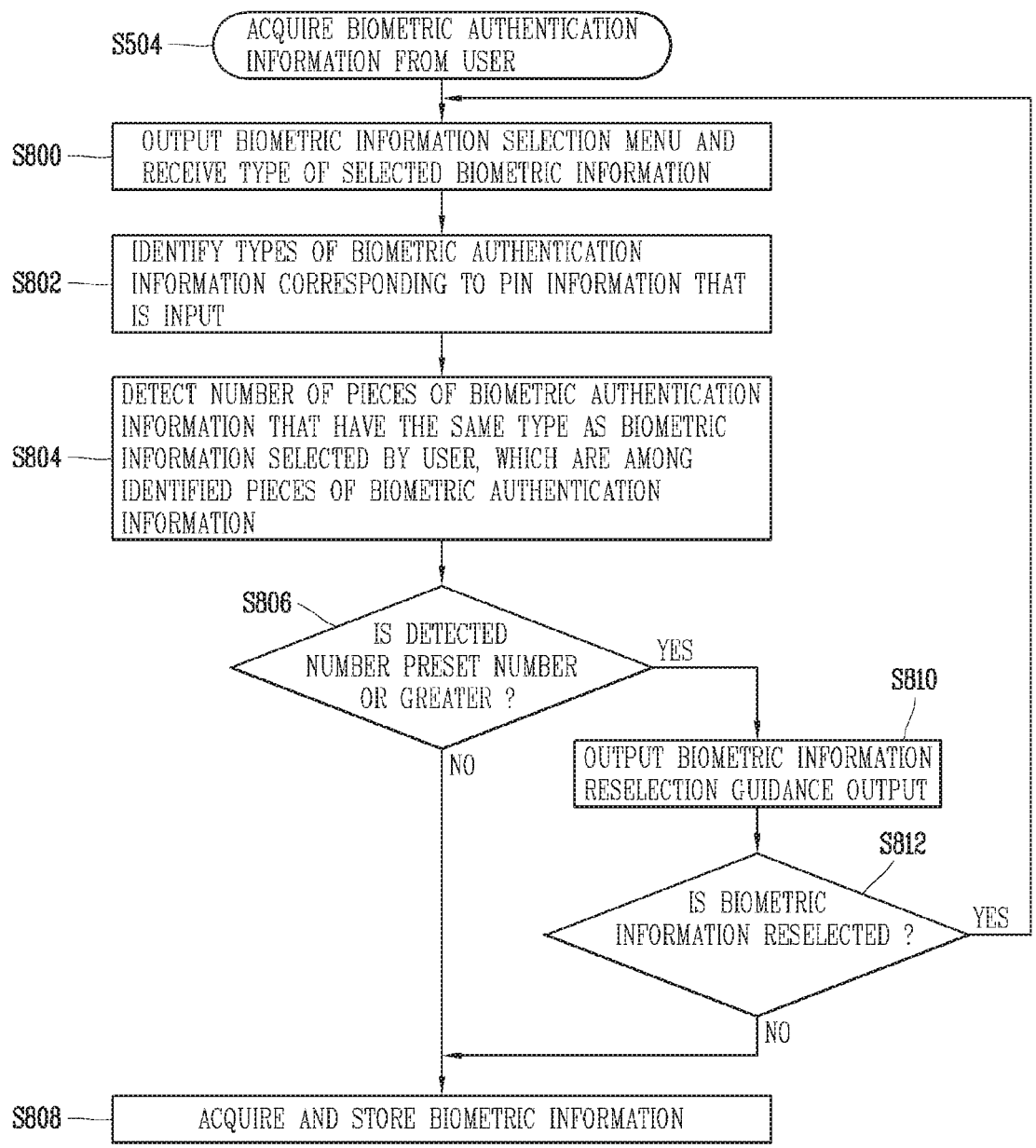
FIG. 8 is a flowchart illustrating in more detail an operation of acquiring the biometric authentication information from the user, which is among the processes that are illustrated in FIG. 5.

FIG. 8 is a flowchart illustrating in more detail Step S504 in FIG. 5 in which the biometric authentication information is acquired from the user in this case.

With reference to FIG. 8, the controller 150 of the electronic device 100 according to the embodiment of the present disclosure is described as controlling the registration terminal 120a and thus outputting a menu for selecting biometric information that is to be input by the user. Then, information on a type of biometric information selected by the user from the menu that is output is received (S800).

Then, the controller 150 identifies a type of each of the pieces of biometric authentication information that correspond to the PIN information which is input in Step S502 in FIG. 5 (S802). Then, among pieces of biometric authentication information of which types are identified, the number of pieces of biometric authentication information of which types are the same as the type that is selected by the user in Step S800 are detected (S804).

As an example, preregistered pieces of biometric authentication information that correspond to the PIN information described above are pieces of biometric authentication information different in type from each other. For example, fingerprint information, iris identification information, facial recognition information, and so on correspond to one piece of PIN information. In this state, in a case where the user selects the fingerprint information in Step S800, in Step S804, the controller 150 selects the number of pieces of fingerprint information from among pieces of biometric authentication information different in size from each other, which correspond to the PIN information described above.

Then, the controller 150 determines whether or not the number of pieces of biometric authentication information of the same type, which are selected in Step S804, is a preset number (S806).

The "preset number" here is decided according to the time taken for the user authentication. That is, the time it takes to compare the biometric information acquired in the authentication terminal 120b and any one of the pieces of biometric authentication information included in the comparison group, and the number of pieces of biometric authentication information in the maximum comparison group in accordance with the maximum allowance time for high-speed user authentication are calculated. Then, the calculated number is the "preset number in Step S806.

In a case where, as a result of the determination in Step S806, the number of biometric authentication information of the same type is smaller than the preset number, in order to acquire the biometric information selected by the user, the controller 150 controls the registration terminal 120a such that the biometric authentication information is sensed from the user and such that the sensed biometric information is transferred to the controller 150 (S808).

On the other hand, in a case where, as a result of the determination in Step S806, the number of pieces of biometric authentication information of the same type is the preset number or greater, the controller 150 controls the registration terminal 120a such that information on the number of currently-detected pieces of biometric authentication information is provided to the user for guidance. As an example, under the control of the controller 150, the registration terminal 120a displays information on the estimated time taken for the user authentication in accordance with the number of currently-detected pieces of biometric authentication information. Then, the controller 150 outputs biometric information reselection guidance information for recommending that the user select other biometric information (S810).

Then, the controller 150 checks whether or not the user reselects other biometric information as a result of the output of the biometric information reselection guidance information in Step S810 (S812). Then, in a case where the user reselects the biometric information, Steps S802 to S806 are again performed according to a type of the reselected biometric information. Then, proceeding to Step S808 may take place according to the result in Step S806, and the registration terminal 120a may be controlled such that the biometric information is sensed from the user, and such that the sensed biometric information is transferred to the controller 150. Alternatively, Steps S810 to S812 may be again performed and a request may be made for the reselection of the biometric information.

On the other hand, of course, regardless of the guidance information that is output in Step S812, input of currently-selected biometric information may be maintained. Then, the controller 150 proceeds to Step S808 and controls the registration terminal 120a such that the currently-selected biometric information is acquired.

On the other hand, as described above, according to the present disclosure, at least two pieces of biometric information are registered. Thus, a process in FIG. 8 is performed multiple times for each of at least the two pieces of biometric information.

On the other hand, even in a case where the processes that are described with reference other than FIG. 8 are sequentially performed for each piece of biometric information in the order in which types of biometric information that are to be input by the user are selected and where multiple pieces of biometric information are thus registered, all the multiple pieces of biometric information correspond to the PIN information that is input in Step S502 in FIG. 5, and thus neither dominance relationships among the pieces of biometric information, nor the order of the pieces of biometric information are formed.

That is, in a case where the user registers the fingerprint and the iris information together with specific PIN information, the fingerprint information and the iris information are included, as pieces of biometric authentication information corresponding to the specific PIN information, in one group. Therefore, when the biometric information for the user authentication is input from the authentication terminal 120b, the user can input any one of the user authentication and the iris information, and the user authentication is accordingly performed.

On the other hand, in a different manner, in a case where the user registers the biometric information from the registration terminal 120a, of course, the order in which pieces of biometric information that are to be registered are authenticated may be set according to user's selection. In this case, in a case where the user makes a request for authentication from the authentication terminal 120b, the biometric information has to be input according to the authentication order in order to perform the user authentication. In this case, if the order of pieces of biometric information is different, even in a case where the user's genuine biometric information is input, of course, the user authentication may not be performed.

On the other hand, the registration terminal 120a that registers as the biometric authentication information the biometric information which is input from the user, and the authentication terminal 120b that performs various functions, such as payment and personal background checking, through the user authentication in accordance with the biometric information acquired from the user are described above as terminals distinguished from each other. However, this helps to provide convenience of description and, of course, the present disclosure is not limited to this. That is, the registration terminal 120a and the authentication terminal 120b may be one terminal of the same time.

The present disclosure can be implemented as computer-readable codes in a program-recorded medium. The computer readable medium includes all kinds of recording devices in which data readable by a computer system is stored. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). In addition, the computer may also include the controller 180. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:

1. An electronic device for performing multimodal biometric authentication, the electronic device comprising:
   a controller configured to:
   when performing new user registration, receive, from a first terminal, a personal identification number and biometric information sensed from a user;
   register and store the received biometric information as biometric authentication information corresponding to the personal identification number received in an authentication information database, wherein the authentication information database is a database in which biometric information of different registered users are grouped according to a string of numbers constituting a personal identification number input from each user such that biometric information corresponding to a same or similar personal identification number is stored into one group;
   when performing user authentication, receive, from a second terminal a personal identification number and biometric information sensed from a user;
   when performing the user authentication, receive, select pieces of biometric authentication information corresponding to the personal identification number that is input through a second terminal from among pieces of biometric authentication information stored in the authentication information database; and
   when performing the user authentication, form a comparison group for the user authentication based on the selected pieces of biometric authentication information; and
   a security module configured to compare the comparison group and the biometric information of the user that is input from the second terminal and to perform the user authentication, and
   when the personal identification number for user authentication is input from the second terminal, the controller is further configured to detect at least one group corresponding to the same or similar string of numbers to the input personal identification number and to set the detected at least one group as the comparison group, wherein the electronic device is connected to at least one terminal including multiple sensors for sensing the biometric information of the user and to an input for receiving the personal identification number from the user.

2. The electronic device of claim 1, wherein the controller is further configured to:
   detect, in the authentication information database, a number of pieces of biometric authentication information that correspond to the personal identification number input from the first terminal and, based on a determination that the detected number is equal to or greater than a preset number, receive any other personal identification number input from the user when performing the new user registration.

3. The electronic device of claim 1, when a type of the biometric information that is input by the user is selected when the new user registration is performed, wherein the controller is further configured to:
   identify types of pieces of biometric authentication information that correspond to the personal identification number received from the first terminal in the authentication information database,
   detect a number of pieces of biometric authentication information that correspond to the user-selected type of the biometric information, from among pieces of biometric authentication information of which types are identified, and,
   based on a determination that the selected number is equal to or greater than a preset number, receive any other type of biometric information.

4. The electronic device of claim 3, wherein the preset number is determined according to a time taken for comparing the biometric information of the user input from the first terminal, and any one of the pieces of biometric authentication information included in the comparison group, or a preset maximum allowance time for high-speed user authentication.

5. The electronic device of claim 1, wherein the controller is further configured to:
   determine an order of authentication according to a selection of the user, and
   when performing the new user registration, register a plurality of different pieces of biometric information received from the first terminal as first biometric authentication information and second biometric authentication information, wherein the first biometric authentication information is different from the second biometric authentication information, and
   when performing the user authentication, control an operation of the electronic device according to a result of the user authentication that sequentially compares the biometric information input from the second terminal with the first biometric authentication information and the second biometric authentication information, and
   wherein the security module is further configured to determine whether or not a remaining part of the user authentication is performed based on the result of the user authentication in accordance with the first biometric authentication information.

6. The electronic device of claim 1, wherein the controller is further configured to:
   when performing the new user registration, receive personal information of the user together with the personal identification number and the biometric information sensed from the user from the first terminal, when performing a user authentication for payment, detect the personal information of the user based on the personal identification number and biometric information of the user being input from the second terminal, apply a discounted rate to a payment amount according to the detected personal information of the user, and receive the payment amount according to the applied discounted rate.

7. The electronic device of claim 1, wherein the controller is further configured to:

when performing the new user registration, based on a determination that the biometric authentication information corresponding to the personal identification number is registered, issue an authentication registration card that includes registered biometric authentication information and a personal identification number corresponding to the biometric authentication information to the user.

8. The electronic device of claim 7, wherein the authentication registration card is an electronic card that includes the biometric authentication information encrypted into the personal identification number.

9. The electronic device of claim 1, wherein the controller is further configured to:

when performing the new user registration, based on a determination that personal identification number and biometric information of the user is received from the first terminal, determine whether preregistered biometric authentication information having the same personal identification number is present, and, based on a determination that the preregistered biometric authentication information having the same personal identification number is present as a result of the detection, group and store pieces of biometric information received from the first terminal as pieces of biometric authentication information associated with the same group as the preregistered pieces of biometric authentication information.

10. A method of controlling an electronic device that performs multimodal biometric authentication, the method comprising:

when performing new user registration, receiving, from a first terminal, personal identification information and biometric information of a user;

registering and storing the received biometric information as biometric authentication information corresponding to the personal identification information received in an authentication information database, wherein the authentication information database is a database in which biometric information of different registered users are grouped according to a string of numbers constituting a personal identification number input from each user such that biometric information corresponding to a same or similar personal identification number is stored into one group;

when performing user authentication, acquiring, from a second terminal, personal identification information of the user and biometric information of the user;

when performing user authentication, selecting pieces of biometric authentication information that correspond to the personal identification information input through the second terminal from among pieces of biometric authentication information stored in the authentication information database;

setting the selected pieces of biometric authentication information as a comparison group for the user authentication by detecting at least one group corresponding to a same or similar number sequence to a personal identification number when the personal identification number for user authentication is input and setting the detected biometric information of at least one group as the comparison group; and comparing each of the pieces of biometric authentication information included in the comparison group and the biometric information of the user acquired through the second terminal for performing the user authentication.

11. The method of controlling the electronic device of claim 10, wherein the first terminal and the second terminal are one terminal of a same type.

* * * * *